US009682419B2

(12) United States Patent
Schmidt

(10) Patent No.: US 9,682,419 B2
(45) Date of Patent: Jun. 20, 2017

(54) METHOD AND TOOL FOR SETTING BLIND RIVET ELEMENTS

(76) Inventor: Heiko Schmidt, Lappersdorf (DE)

( * ) Notice: Subject to any disclaimer, the term of this patent is extended or adjusted under 35 U.S.C. 154(b) by 256 days.

(21) Appl. No.: 13/810,574

(22) PCT Filed: Aug. 24, 2011

(86) PCT No.: PCT/DE2011/001652
§ 371 (c)(1),
(2), (4) Date: Apr. 3, 2013

(87) PCT Pub. No.: WO2012/025102
PCT Pub. Date: Mar. 1, 2012

(65) Prior Publication Data

US 2013/0180098 A1 Jul. 18, 2013

(30) Foreign Application Priority Data

Aug. 26, 2010 (DE) ........................ 10 2010 035 613

(51) Int. Cl.

| | |
|---|---|
| ***B21D 9/05*** | (2006.01) |
| ***B21J 15/02*** | (2006.01) |
| ***B23P 11/00*** | (2006.01) |
| ***B21J 15/28*** | (2006.01) |
| ***B25B 27/00*** | (2006.01) |
| ***B21J 15/10*** | (2006.01) |
| *B21J 15/04* | (2006.01) |

(52) U.S. Cl.
CPC ............. *B21J 15/02* (2013.01); *B21J 15/043* (2013.01); *B21J 15/10* (2013.01); *B21J 15/28* (2013.01); *B21J 15/285* (2013.01); *B25B 27/0014* (2013.01); *B21J 15/04* (2013.01); *Y10T 29/49956* (2015.01); *Y10T 29/5377* (2015.01)

(58) Field of Classification Search
CPC . B21J 15/02; B21J 15/10; B21J 15/043; B21J 15/28; B21J 15/285; B21J 15/04; B25B 27/0014; Y10T 29/49956; Y10T 29/5377
USPC .............. 29/525.05, 243.5, 243.53, 243.521, 29/243.522, 243.523, 243.524, 243.525, 29/243.54, 812.5; 72/391.2, 391.4, 391.8
See application file for complete search history.

(56) References Cited

U.S. PATENT DOCUMENTS 4,574,612 A * 3/1986 Tanikawa ............ B25B 27/0014 72/114
4,754,643 A * 7/1988 Weeks, Jr. ............... B21J 15/28 227/110
5,605,070 A * 2/1997 Wille .................. B25B 27/0014 72/114
5,655,289 A * 8/1997 Wille ....................... B21J 15/26 29/243.53

(Continued)

*Primary Examiner* — Sarang Afzali
*Assistant Examiner* — Darrell C Ford
(74) *Attorney, Agent, or Firm* — Welsh Flaxman & Gitler LLC

(57) ABSTRACT

A method for setting blind rivet elements in which the setting of the respective blind rivet element introduced into a pre-hole of the work piece and/or the formation of a rivet collar takes place in a setting stroke (SH) through the permanent deformation of a section of the blind rivet element by subjecting an end of the blind rivet element to a traction force by a traction element of a setting tool while simultaneously supporting another end of the blind rivet element on a support part of the setting tool counter to the traction force.

10 Claims, 3 Drawing Sheets

(56) References Cited

U.S. PATENT DOCUMENTS 5,666,710 A * 9/1997 Weber .................... B21J 15/105 227/2
5,673,839 A * 10/1997 Howard ................... B21J 15/28 173/21
5,956,251 A * 9/1999 Atkinson ................. G07C 3/14 700/109
6,272,899 B1 * 8/2001 Bentivogli ................... 72/391.8
6,684,470 B1 * 2/2004 Joux ........................ 29/243.521
6,957,483 B2 * 10/2005 Woods .................. B23P 19/062 227/2
7,032,281 B1 * 4/2006 Lin .......................... 29/243.525
7,503,196 B2 * 3/2009 Chitty et al. ................... 72/21.4
7,536,764 B2 * 5/2009 Weeks et al. .............. 29/407.08
8,316,524 B1 * 11/2012 LeMieux ................. B21J 15/10 29/524.1
2004/0063362 A1 * 4/2004 Weeks ................... B21J 15/105 439/894
2004/0162151 A1 * 8/2004 Mauer et al. ................. 470/209
2004/0226159 A1 * 11/2004 Harlow .................. B21J 15/285 29/525.01
2005/0053449 A1 * 3/2005 Grubert ................... F16B 5/025 411/546
2005/0217097 A1 * 10/2005 Solfronk ................ B21J 15/043 29/243.521
2006/0230591 A1 * 10/2006 Chitty ...................... B21J 15/28 29/243.523
2007/0033788 A1 2/2007 Chitty et al.
2007/0113390 A1 * 5/2007 Chitty ...................... 29/243.523
2008/0170926 A1 7/2008 Taylor
2008/0250832 A1 * 10/2008 Sanchez-Brunete Alvarez ......................... 72/17.3
2010/0257720 A1 * 10/2010 Schiffler ................ B21J 15/043 29/525.06
2011/0289762 A1 * 12/2011 Wille .................. B25B 27/0014 29/525.06
2013/0250730 A1 * 9/2013 Guzman Rabanillo .. B21J 15/28 367/87
2014/0037398 A1 * 2/2014 Grojean et al. ................... 411/3

* cited by examiner

METHOD AND TOOL FOR SETTING BLIND RIVET ELEMENTS

BACKGROUND OF THE INVENTION

The invention relates to a method for setting blind rivet elements in which the setting of the respective blind rivet element introduced into a pre-hole of the work piece and/or the formation of a rivet collar takes place in a setting stroke (SH) through the permanent deformation of a section of the blind rivet element by subjecting an end of the blind rivet element to a traction force by means of a traction element of a setting tool while simultaneously supporting another end of the blind rivet element on a support part of the setting tool counter to the traction force. Prior to forming the rivet collar the state of the disposition of the respective blind rivet element on the setting tool and/or the distance corresponding to this state between the blind rivet element and the tool support part is detected. The invention also relates to a setting tool for processing or setting the blind rivet elements.

Blind rivet elements, according to the invention, are primarily blind rivet nuts, but can also be other normally used blind rivet elements, such as blind rivets and blind rivet bolts.

The setting of blind rivet elements, according to the invention, means securing the respective blind rivet element introduced into a pre-hole of a work piece by riveting, i.e. by forming a rivet collar by applying a traction force through a traction element, through a traction mandrel to an area or an end of the blind rivet element that is remote from the rivet flange of the blind rivet element on which the blind rivet element is supported on a tool support part during setting. The rivet collar is formed through permanent deformation of a rivet element section. The rivet collar secures the blind rivet element against being pressed out and/or twisting in the work piece.

Setting of blind rivet elements in the form of blind rivet nuts takes place with the spin-pull method. In accordance with the spin-pull method the respective blind rivet nut is screwed with its nut or inner thread formed on one end of the blind rivet nut body onto the outer thread of a traction mandrel, i.e. by spinning it on. Securing of the blind rivet nut inserted into a pre-hole of a work piece takes place by pulling the traction mandrel while simultaneously supporting the blind rivet nut on the tool support part with its blind rivet nut end or rivet flange that is remote from the inner thread, namely deforming the rivet collar from a section of the blind rivet nut body not received in the pre-hole. Pulling of the traction mandrel takes place either until a pre-defined traction force is reached or until a pulling distance (setting stroke) defined by at least one stop is reached. Upon reaching the complete setting stroke, or the traction force, the traction mandrel is screwed out of the inner thread of the set blind rivet nut.

A frequent cause for faulty setting of blind rivet nuts in work pieces exists in the case of manual processing, but also in the case of automatic processing due to the fact that the traction mandrel is not completely screwed into the respective blind rivet nut, i.e. spinning of the blind rivet nut onto the traction mandrel is incomplete, namely so that the blind rivet nut and the rivet flange have an axial distance from the tool support part that exceeds a pre-defined tolerance range and/or the traction mandrel is received with its threads only partially in the inner thread of the blind rivet nut. During the setting process, i.e. during pulling of the traction mandrel, this produces first a pre-stroke, which takes place without deformation of the blind rivet nut body and in which the blind rivet nut is only brought to bear against the tool support part. If the maximum stroke of the traction spindle is pre-defined by at least one stop, the actual setting stroke available for setting is reduced, namely with the result that the actual setting stroke or the actual pulling distance is not sufficient for correct formation of the rivet collar. Furthermore, the incorrect or incomplete spinning on of the respective blind rivet nut onto the traction mandrel has the disadvantage that the latter engages with only a reduced axial length in the inner thread of the blind rivet nut, resulting in stripping or damage to said inner thread, namely in particular also if the maximum stroke or pulling distance of the traction mandrel is not limited by stops, but instead the setting process is controlled by the traction force exerted on the respective blind rivet nut.

Equivalent or similar problems also occur during setting of other blind rivet elements, which during blind riveting likewise are secured in the work piece with their rivet flange bearing against a tool support part by the traction force exerted by a traction element of the blind rivet tool to a traction mandrel or rivet mandrel of the blind rivet element, thus forming a rivet collar. Here again in case of incorrect disposition of the respective rivet element on the blind riveting tool, i.e. in case of a distance between the rivet flange and the tool support part exceeding a pre-defined tolerance range, this will result at least in incomplete formation of the rivet collar.

Up to now, incorrectly set blind rivet elements must be removed and/or repaired in a time-consuming process.

It is an object of the invention is to present a method that avoids the aforementioned disadvantages and in which the setting process is discontinued or paused or a correction of the setting stroke takes place in advance, i.e. before actual setting, if the respective blind rivet element is not correctly disposed on the blind riveting tool, i.e. its distance from the tool support part exceeds a pre-defined tolerance range.

SUMMARY OF THE INVENTION

A special characteristic of the blind riveting tool is that the respective setting stroke is variable, preferably continuously variable and/or variable by means of a motor-actuated end stop. This embodiment offers the fundamental advantage that the same riveting or setting tool can be used to process different blind rivet elements, especially also in case of different work piece or sheet metal thicknesses. Preferably, the setting stroke is variable in a program-controlled manner.

Further embodiments, advantages and possible applications of the invention are disclosed by the following description of exemplary embodiments and the drawings. All characteristics described and/or pictorially represented, alone or in any combination, are subject matter of the invention, regardless of their being summarized or referenced in the claims. The content of the claims is also included as part of the description.

BRIEF DESCRIPTION OF THE DRAWINGS

The invention is described in the following based on exemplary embodiments for setting blind rivets. The invention is illustrated in the drawings, where.

DETAILED DESCRIPTION OF THE INVENTION

Figure 1:
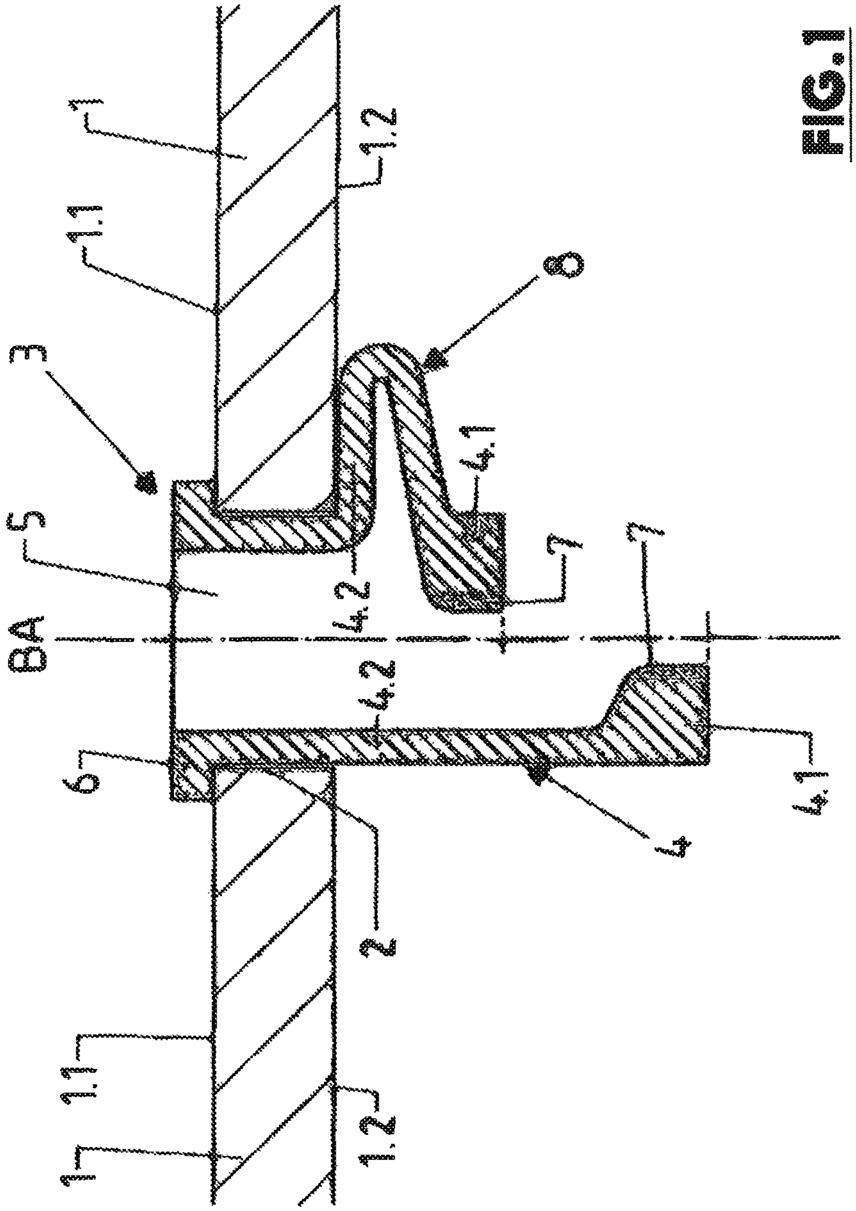
FIG. 1 shows a schematic representation of a work piece manufactured from a flat material, for example from a flat metal material or metal sheet, together with a blind rivet nut in the initial state and in the riveted or set state.
Figure 2:
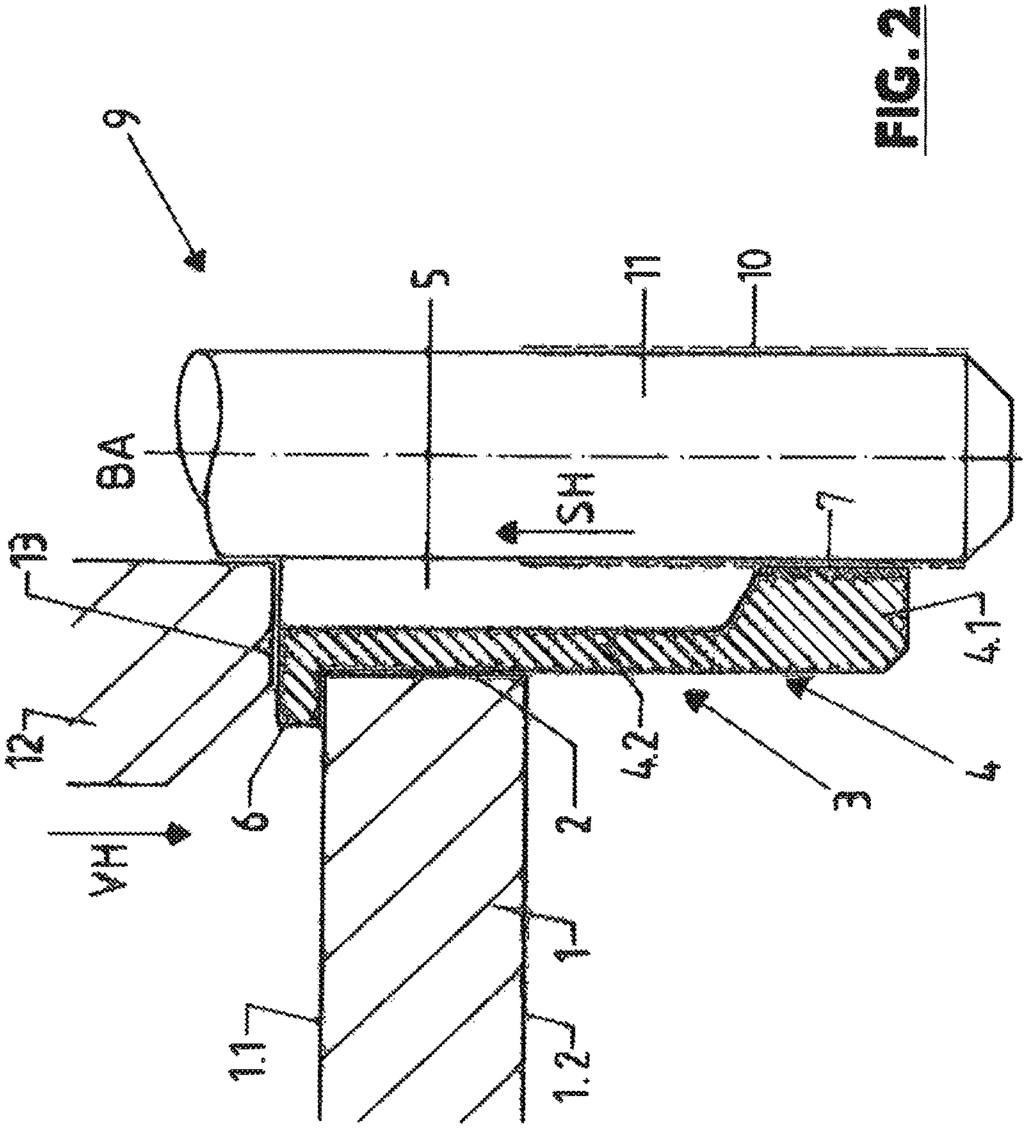
FIG. 2 shows an enlarged schematic partial representation of the blind rivet nut set in the work piece, together with the traction mandrel and the tool support part of a blind rivet or setting tool for the spin-pull method.

In the drawings, a work piece 1 is manufactured from a flat metal material, e.g. from sheet steel or sheet aluminum, with a pre-hole 2. Into the pre-hole 2, a blind rivet nut 3 is inserted, which is shown in FIG. 1 at the left in its not yet deformed state that it has, immediately after insertion or introduction into the pre-hole 2, and which is shown in FIG. 1 at the right in its deformed or riveted or set state. The blind rivet nut 3 is manufactured from a metal material, for example, from steel or aluminum, and consists in the manner known to persons skilled in the art essentially of a sleeve-like blind rivet nut body 4 having a continuous opening 5 disposed on the same axis with the axis BA of the blind rivet nut 3 and having a rivet flange 6 radially protruding over the outer surface of the blind rivet nut body 4 on the upper end of the blind rivet nut 3 as shown in FIG. 1. body 4, which is cylindrical in shape on the outer and inner surface, comprises essentially two sections, namely the section 4.1 that is remote from the flange 6 and on which the opening 5 is provided with a nut or inner thread 7, and the section 4.2, which merges into the rivet flange 6 and in which the opening 5 is threadless and is embodied with an enlarged cross section. In riveted or set state, the blind rivet nut 3 lies with its rivet flange 6 against the one work piece side 1.1 of the work piece 1, which as depicted in FIG. 1 is the top side. The section 4.2 not received in the pre-hole 2 is, in the manner depicted in FIG. 1 at the right, permanently deformed into a bead-shaped rivet collar 8 enclosing the axis BA in a ring-like manner, the rivet collar is pressed against the other work piece side 1.2 of the work piece, so that the blind rivet nut 3 is secured in the work piece 1 all the way around in the area of the pre-hole against being pressed out or turned or twisted in the work piece 1. Since the wall thickness of the blind rivet nut body 4 in the section 4.2 is reduced, the defined deformation of the blind rivet nut body 4 to form the rivet collar 8 takes place in this area not received in the pre-hole 2.

The setting tool 9 comprises a traction mandrel 11 provided on one end with a thread 10 and a tool head 13 enclosing the traction mandrel 11, the tool head 13 forms a ring-shaped support part enclosing the traction mandrel 11.

In detail, the setting of the respective blind rivet nut 3 takes place according to the spin-pull method. As such, the blind rivet nut 3 provided at a pick-up position (not depicted) is screwed or spun with the inner thread 7 onto the thread 10 of the traction mandrel 11 by turning the traction mandrel 11 disposed on the same axis as the axis BA and inserted by the rivet flange 6 into the opening 5, namely so that the blind rivet nut 3 in the end ideally bears with the side of the blind rivet nut body 4 that is remote from the thread 7 and/or with the rivet flange 6 against the support part 13 of the tool body 12. Held in this manner on the setting tool 9, the blind rivet nut 3 is inserted into the pre-hole 2 so that the rivet flange 6 bears against the work piece side 1.1. Turning of the traction mandrel 11 during spinning on takes place by means of a rotary drive 14, which is depicted schematically in FIG. 3. After insertion of the blind rivet nut 3 into the work piece 1, the setting takes place through relative movement between the traction mandrel 11 and the tool head 13, namely in the manner that with the tool head 12 bearing against the rivet flange 6, a traction force is exerted via the traction mandrel 11 on the end of the blind rivet nut body 4 provided with the thread 7, therefore deforming the section 4.2 to form the rivet collar 8.

Due to tolerances and also due to the deformability of the blind rivet nut 3 and/or of the work piece 1, in many cases, a relative movement between the traction mandrel 11 and the tool body 12 and/or the tool head 13 takes place in the form of a small pre-stroke VH prior to the actual setting and/or deformation of the section 4.2 to form the rivet collar 8. The relative movement between the traction mandrel 11 and the tool body 12 and/or the tool head 13 needed for setting the blind rivet nut 3 is achieved by means of a drive 15 acting between these tool parts, e.g. in the form of at least one piston-cylinder arrangement or a hydraulic cylinder, indicated schematically in FIG. 3.

To ensure correct formation of the rivet collar 8 and in particular also to prevent stripping of the inner thread 7 due to excessively high traction forces exerted by the traction mandrel 11 during setting it is common to limit the distance of the setting stroke SH and/or the traction force exerted by the traction mandrel 11 to a pre-defined value.

Especially if the drive 15 consists of a piston-cylinder arrangement, for example a hydraulic cylinder, the maximum setting stroke SH is pre-defined by corresponding stops.

In the case of manual processing of the blind rivet nuts 3, the respective setting tool 9 is designed as a manually operated tool, and also in automated processing of the blind rivet nuts 3, the setting tool 9 is part of a production system or a work station of such a system, it cannot be ruled out that blind rivet nuts 3 are to some extent spun insufficiently onto the traction mandrel 11, so that their rivet flange 6 is still at a distance from the tool head 13.

If, after being spun on the distance between the rivet flange 6 and the tool head 13 is greater than a pre-defined tolerance range, this results in a larger pre-stroke VH and therefore a reduction of the setting stroke SH available for setting.

Figure 3:
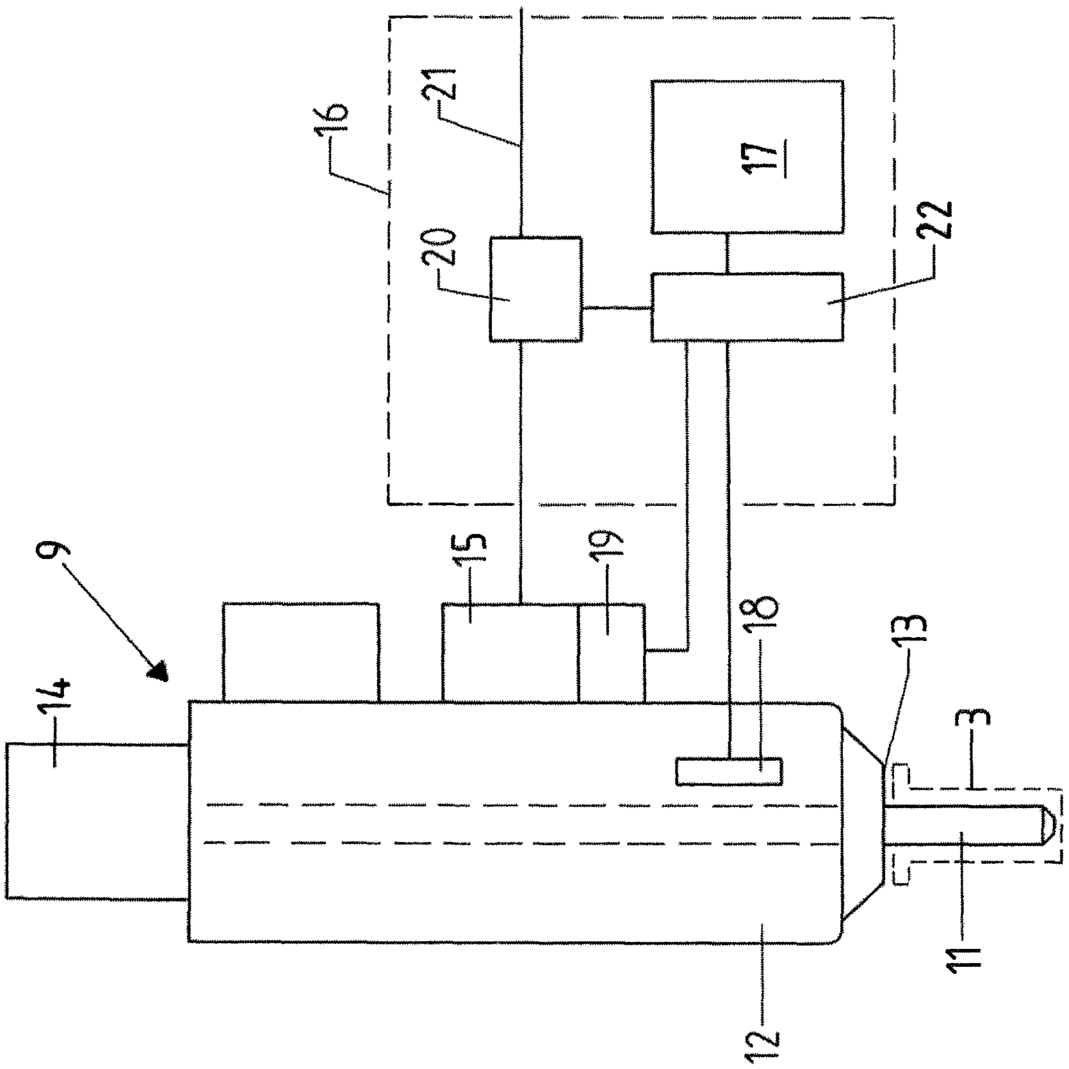
FIG. 3 shows a schematic functional representation of the setting tool, together with a monitoring and electronic control circuit.

The insufficient spinning on of the blind rivet nut 3 onto the traction mandrel 11 and/or the thread 10 there and the resulting increased pre-stroke VH cause the rivet collar 8 to be formed incorrectly, which means that the anchoring of the blind rivet nut 3 in the work piece 1 is faulty. Furthermore, the insufficient spinning of the blind rivet nut 3 onto the traction mandrel 11 causes the thread 10 to engage in the inner thread 7 only over a shortened axial length so that it becomes stripped during pulling and/or deformation of the section 4.2. In current practice, such an incorrectly set blind rivet nut 3 must be removed from the work piece 1 in a time-consuming repair procedure and replaced by a correctly set blind rivet nut 3. This disadvantage is avoided by the electronic monitoring and control circuit 16 with a processor 17 as depicted in FIG. 3 and allocated to the setting tool 9 and comprising at least the following:

a sensor 18 that measures the path of the relative movement between the traction mandrel 11 and the tool body 12 and sends a measuring signal based on this path to the processor 17;

a pressure sensor 19 that serves to measure the hydraulic pressure present at the drive 15 and/or in a cylinder chamber there and sends a corresponding measuring signal to the processor 17;

a control valve arrangement 20 that is controlled by the processor 17, namely for control of the drive 15 and/or for controlling the pneumatic or hydraulic pressure medium, e.g. hydraulic oil, supplied to said drive via a hose 21;

an interface arrangement 22 by means of which data transfer takes place between the processor 17 and the sensors 18 and 19 and the control valve arrangement 20 and which also serves as an external connection for data traffic with other peripheral devices and/or for controlling other functional units of the setting tool 9 or a system comprising said setting tool.

The monitoring and control apparatus 16, by detecting the spinning-on state of the respective blind rivet nut 3, allows different methods for preventing incorrect setting of the respective blind rivet nut 3, namely either by interrupting or stopping the setting process or by correcting the size of the setting stroke SH and/or the traction force exerted on the traction mandrel 11 during setting based on the detected pre-stroke VH. The latter can then be detected or measured directly by the sensor 18 or indirectly by the drive 15 and/or the at least one piston-cylinder arrangement forming said drive being subjected to the highly pressurized pressure medium or hydraulic oil one time or several times consecutively by temporary opening of the control valve arrangement 20 and then measuring, with the pressure sensor 19, the respective pressure at the drive 15 and, based on this pressure, calculating the size of the pre-stroke VH in the processor 17.

In detail, the following operating methods are possible:

1. After inserting the respective blind rivet nut 3 into the pre-hole 2, upon triggering of the setting process and/or in a detection phase, a traction force is first exerted via the drive 15 on the traction mandrel 11, which (force) is reduced so far that it does not yet cause deformation of the blind rivet nut 3. If the blind rivet nut 3 is only insufficiently spun onto the traction mandrel 11, this results in an enlarged pre-stroke VH in the form a relative movement between the traction mandrel 11 and the tool head 13, relative movement is detected by the sensor 18. If the relative movement or the pre-stroke VH exceeds a pre-defined tolerance range, the setting process is stopped before deformation of the blind rivet nut 3 and/or formation of an insufficient rivet collar 8 occurs. The blind rivet nut 3 is then either spun onto the traction mandrel 11 correctly in a follow-up process or it is replaced by another blind rivet nut 3 that is correctly spun onto the traction mandrel 11. Implementation of this method requires only the position sensor 18 or a corresponding position measuring system.

2. Further, it is possible to design the sensor 18 as a switch or microswitch, which is then actuated if, after triggering of the setting process initially with low force, due to the distance between the rivet flange 6 of an insufficiently spun on blind rivet nut 3 and the tool support part 13 the relative movement between the traction mandrel 11 and the tool body 12, i.e. the pre-stroke VH, exceeds a value that is outside of the permissible tolerance range. After triggering of the switch the setting process is likewise stopped. The design of the sensor 18 as a switch has the special advantage that said switch can be used to stop the setting process directly, therefore allowing a purely mechanical, pneumatic or hydraulic control without electronics, i.e. without the processor 17.

3. Further, it is possible to subject the traction mandrel 11 and/or the drive 15 for a short defined time to the full force or with the full pressure of the pressure medium in the hose 21, namely until reaching a pre-defined pressure monitored by the pressure sensor 19 that is not sufficient to deform the blind rivet nut 3 inserted into the pre-hole 2 and/or to form a rivet collar 8. The path of the relative movement occurring during this time between the traction mandrel 11 and the tool head 12 is likewise detected and constitutes a measure for the incomplete spinning on of the blind rivet nut 3 and for the axial distance between the rivet flange 6 and the tool support part 13. For pressure monitoring, the pressure sensor 19 or a load cell or a strain gauge can be used. The path is again detected by the sensor 18; other analog or digital position measuring systems or one or more electric switches, for example microswitches, can be used to detect the relative movement between the traction mandrel 11 and the tool body 12 and/or for detecting the pre-stroke VH. If said pre-stroke VH exceeds a pre-defined tolerance range, the setting process will again be stopped.

4. It was assumed above that based on the pre-stroke VH detected directly or indirectly in a detection phase the setting process is executed within a pre-defined tolerance range or discontinued outside a pre-defined tolerance range. Generally, it is also possible to correct the setting stroke SH based on the detected pre-stroke VH, i.e. to increase it, in the manner that the actually executed, corrected setting stroke SH is the sum of the detected pre-stroke VH and a pre-defined setting stroke, which is defined by the type of blind rivet nuts 3 used and in particular also by the thickness of the respective work piece 1. If the size or the maximum path of the relative movement generated with the drive 15 between the traction mandrel 11 and the tool body 12 is defined by stops, then the correction of the setting stroke takes place for example by motorized adjustment of these stops. Further, the correction of the setting stroke SH can also be achieved by constant monitoring of the relative movement between the mandrel 11 and the tool body 12 with the sensor 18 or another position measuring system and/or constant monitoring of the pressure of the pressure medium and therefore of the traction mandrel 11 with the sensor 19 and after reaching pre-defined values corresponding to the corrected setting stroke, the drive 15 is immediately switched off by the processor 19, by closing the control valve arrangement 20. Prerequisite, yet at least expedient for this method, is that the correction of the setting stroke takes place only if the pre-stroke VH first detected after initiation of the setting process in the detection phase is within a tolerance range that ensures that the traction mandrel 11 engages with its thread 10 at least over such an axial length in the inner thread 7 of the blind rivet nut 3, the axial length reliably prevents stripping of the inner thread 7 at the traction force exerted by the traction mandrel 11 necessary for correct forming of the rivet collar 8.

The invention was described above based on exemplary embodiments. Of course, numerous modifications and adaptations are possible, without abandoning the underlying idea upon which the invention is based. All embodiments or methods have in common that at the start of the respective setting process, the state of the spinning of the respective blind rivet nut onto the traction mandrel 11 is detected in a detection phase and then, based on this state, the setting process is executed or interrupted or the setting stroke is corrected.

Different methods for setting blind rivet nuts 3 are described above. It goes without saying that the invention is not limited to blind rivet nuts, but refers in general to blind rivet elements, for example also to blind rivet bolts.

REFERENCE LIST

1 work piece
1.1, 1.2 work piece side

2 pre-hole
3 blind rivet nut
4 blind rivet nut body
4.1, 4.2 section of blind rivet nut body
5 opening of blind rivet nut
6 flange of blind rivet nut
7 inner thread of blind rivet nut
8 rivet collar
9 tool
10 threads
11 traction mandrel
12 tool body
tool head
14 drive for spinning on the blind rivet nuts
15 drive for producing an axial relative movement between traction mandrel 11 and tool body 12
16 monitoring and control apparatus
17 processor
18 sensor for position measurement
19 pressure sensor
20 control valve arrangement
21 hose for hydraulic medium or hydraulic oil under operating pressure
22 interface arrangement
BA blind rivet nut axis
VH pre-stroke
SH setting stroke

The invention claimed is:

1. A method for setting a blind rivet nut comprising a rivet flange and a rivet body introduced into a pre-hole in a work piece, wherein the blind rivet nut is spun in a traction mandrel of a setting tool and the formation of a rivet collar takes place in a setting stroke through permanent deformation of a section of the rivet body of the blind rivet nut, the method comprising the steps of: subjecting an end of the blind rivet nut to a traction force by the traction mandrel of the setting tool while simultaneously supporting the rivet flange of the blind rivet nut on a tool head of the setting tool counter to the traction force, in which prior to forming the rivet collar, a distance is detected between the rivet flange of the blind rivet nut and the tool head of the setting tool is, and comparing the a detected distance between the rivet flange of the blind rivet nut and the tool head with a predefined tolerance range, a setting process of the blind rivet nut is continued in case of the detected distance being smaller than the predefined tolerance range and in case of the detected distance being greater than the predefined tolerance range the setting process is interrupted, wherein during initiation of the setting process, in a detection phase prior to the formation of the rivet collar by the setting stroke, an auxiliary force is exerted on the traction mandrel, such that the auxiliary force is not sufficient for forming the rivet collar.

2. The method according to claim 1, wherein during the detection phase a relative movement between the traction mandrel and the support part is detected as a pre-stroke, and stopping or interruption of the setting process then takes place when the pre-stroke exceeds a pre-defined tolerance range.

3. The method according to claim 2, wherein the pre-stroke is detected by a position sensor or that stopping or interruption of the setting process is effected or caused by at least one electric switch, which is activated in the event of a pre-stroke exceeding a pre-defined tolerance range.

4. The method according to claim 2, wherein in the detection phase, a traction mandrel drive formed by at least one piston-cylinder arrangement is subjected temporarily at least one time to a full operating pressure of a pneumatic or hydraulic pressure medium also used for setting and the pre-stroke triggered by this is determined by a position sensor, by a position measuring system or by measuring a pressure occurring after a momentary pressurization in the at least one piston-cylinder arrangement.

5. The method according to claim 2, wherein in the detection phase a traction mandrel drive made up of at least one piston-cylinder arrangement forming the drive is subjected to an operating pressure of a pneumatic or hydraulic pressure medium until reaching a pressure or a traction force acting on the traction mandrel that is below a traction force needed for forming the rivet collar, and that in this connection the pre-stroke is determined and the pressure in the at least one piston-cylinder arrangement forming the traction mandrel drive is monitored-by at least one sensor measuring a pressure of the pneumatic or hydraulic pressure medium or by a load cell or a strain gauge, which determines the pressure or the force between the traction mandrel drive and the support part.

6. The method according to claim 5, wherein the correction of the setting stroke takes place by an automatic or motorized setting of at least one stop defining a size of the setting stroke.

7. The method according to one of the claim 5, wherein the correction of the setting stroke takes place by the setting stroke being monitored with a position sensor, or by monitoring of the force or of the pressure exerted on the traction mandrel drive by a piston-cylinder arrangement forming the traction mandrel.

8. The method according to claim 2, wherein taking into account the pre-stroke determined in the detection phase, a correction of the setting stroke for setting the blind rivet nut takes place in a form that a size of the pre-stroke is added at least to a partial extent to an initial setting stroke, which is pre-defined by a type of blind rivet nut to be processed and by a type of work pieces and by a thickness of the work pieces.

9. The method according to claim 8, wherein the correction of the setting stroke takes place when the pre-stroke does not exceed a pre-defined tolerance range, which ensures engagement of the traction mandrel drive in an inner thread of the blind rivet nut with sufficient axial length and that upon exceeding a tolerance range, the setting process is stopped or interrupted.

10. A method for setting a blind rivet nut comprising a rivet flange and a rivet body introduced into a pre-hole in a work piece, wherein the setting of the blind rivet nut introduced into the pre-hole of the work piece and screwed by an inner thread onto a thread of a traction mandrel of a riveting tool takes place on a tool head of the a setting tool in a setting stroke, the method comprising the steps of: applying a traction force to the traction mandrel while simultaneously supporting an end of a blind rivet nut at a distance from an inner thread and forming a rivet collar by permanent deformation of a section of the rivet body of the blind rivet nut, whereby prior to forming the rivet collar, a distance between the rivet flange of the blind rivet nut spinning on the traction mandrel and the tool head is detected, and based on the distance detected, a setting process is continued in a case of correct spinning on the traction mandrel or in a case of incorrect spinning on the traction mandrel the setting process is discontinued wherein during initiation of the setting process, in a detection phase prior to the formation of the rivet collar by the setting stroke, an auxiliary force is exerted on the traction mandrel, such that the auxiliary force is not sufficient for forming the rivet collar.

* * * * *